United States Patent [19]

Lake

[11] 3,906,158

[45] Sept. 16, 1975

[54] METHOD AND APPARATUS FOR CONDUCTING AUDIOMETRIC TESTS

[76] Inventor: James Douglas Lake, 140 Random Rd., Princeton, N.J. 08540

[22] Filed: May 15, 1972

[21] Appl. No.: 253,653

Related U.S. Application Data

[63] Continuation of Ser. No. 888,292, Dec. 29, 1969, abandoned.

[52] U.S. Cl. ............................................. 179/1 N
[51] Int. Cl. ............................................. A61b 5/12
[58] Field of Search...... 242/194, 199; 179/100.2 Z, 179/1 N; 346/33 ME; 181/.5 G

[56] References Cited
UNITED STATES PATENTS

| | | | |
|---|---|---|---|
| 2,753,397 | 7/1956 | Zwislocki | 179/1 N |
| 3,237,711 | 3/1966 | Bates | 179/1 N |
| 3,404,235 | 10/1968 | Goldberg | 179/1 N |
| 3,496,296 | 2/1970 | Eskstien | 179/1 N |
| 3,507,501 | 4/1970 | Lear | 179/100.2 Z |
| 3,561,138 | 2/1971 | Catlin | 179/1 N |
| 3,599,894 | 8/1971 | Edwards | 242/194 |

*Primary Examiner*—William C. Cooper
*Attorney, Agent, or Firm*—Melvin A. Crosby

[57] ABSTRACT

The specification discloses a method and apparatus for conducting audiometric tests, particularly characterized in that the tests are conducted under conditions of closely simulating the actual environment with respect to noise normal to the subject. The environmental conditions are simulated by a noise sound track which is supplied to earphones at selected volumes and the hearing acuity of the subject is determined by supplying identifiable signals, such as words, from another sound track to the earphones.

8 Claims, 11 Drawing Figures ature fails to take into account important factors that
METHOD AND APPARATUS FOR CONDUCTING AUDIOMETRIC TESTS This is a continuation of application Ser. No. 888,292, filed Dec. 29, 1969.

This invention relates to audiometry and to methods pertaining thereto.

Many devices and methods have been arrived at for audiometric purposes for determining hearing acuity. Most of the methods and devices heretofore developed, however, have been lacking in providing for reliable and reproducible results or for accurately testing the hearing acuity of the subject being tested under the conditions which the subject normally encounters.

The determination of basic hearing acuity with respect, for example, to the amplitude of a sound, such as a spoken word, which the subject can correctly identify is not particularly difficult but a simple test of this nature fails to take into account important factors that determine actual hearing acuity of the subject under normal environmental conditions.

In particular, conventional audiometer tests to determine hearing acuity do not take into account the background noises to which the subject is exposed when the acuity of the subject's hearing is most important, especially when the subject is engaged in his normal occupation. For example, a subject employed in a certain location in a factory will be exposed to certain types of background noise more or less continuously and it is under these particular conditions that the hearing acuity of the subject is important. Furthermore, each occupation is accompanied by a certain relatively specific background noise at certain substantially constant sound level, and it is only in the presence of such noise that the hearing acuity of a subject can be reliably determined.

It is known, for example, that a subject having a relatively poor degree of hearing acuity under relatively quiet conditions will have a fairly good degree of hearing acuity in a noisy surrounding.

In other circumstances, a subject may be wearing earphones, as in the case of an aircraft pilot, and the only way of analyzing the hearing of such a subject is to check the ears not only in unison but also independently and in the presence of background noise specific to that occupation supplied to either one or both of the ears.

With reference to the "noise" referred to, it is understood that it may be entirely audible or it may consist of a combination of both audible and inaudible acoustic vibrations. The term "noise" as used herein is thus intended to encompass any and all acoustic vibrations or emanations, whether audible or inaudible and forming a part of the environmental conditions to be simulated for test purposes.

With the foregoing in mind, a primary objective of the present invention is the provision of a method of and device for determining hearing acuity which will substantially exactly duplicate the conditions to which the subject being tested will be exposed at that time that the subject's hearing acuity is most important.

Another object of the present invention is the provision of a method and apparatus of conducting audiometric tests which will yield standard reproducible and comparable test results.

A still further object of the invention is the provision of a method and apparatus for audiometric testing which can be made as sophisticated or as simple as may be meeded under any given circumstances.

A still further object of the invention is the provision of a recording for use in audiometric testing in which the amplitude of the audible signals on the recording is preset at the time the recording is made so that absolutely standard conditions can be established for test purposes.

A still further object is the provision of a recording for audiometric testing in which the recording can be utilized only a single time at the testing place thereby preventing the test from being repeated and thereby preventing unreliable results.

Still another object of the present invention is the provision of an apparatus for performing audiometric tests in which identifiable sounds, such as words, and background noises, such as machine or engine sounds, can be supplied to the subject's ears selectively and including volume adjusting means for selectively adjusting the relative volume, or amplitude, of the respective signals employed during the testing.

These and other objects and advantages of the present invention will become more apparent upon reference to the following detailed specification taken in connection with the accompanying drawings in which.

Figure 3:
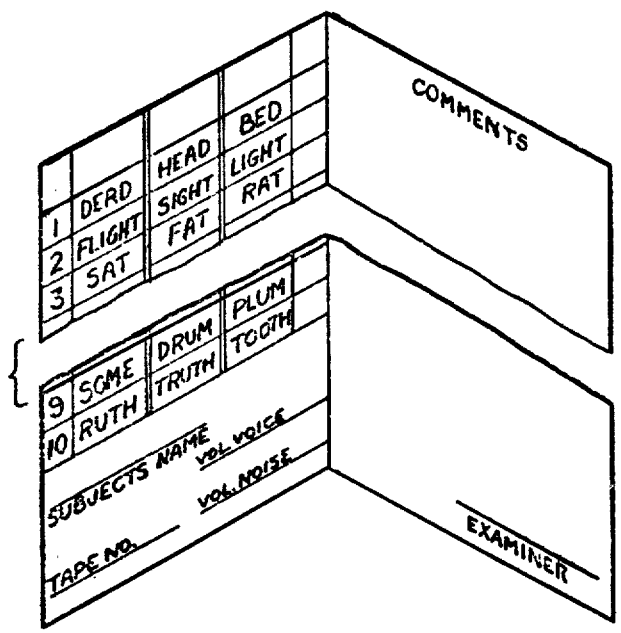
Figure 11:
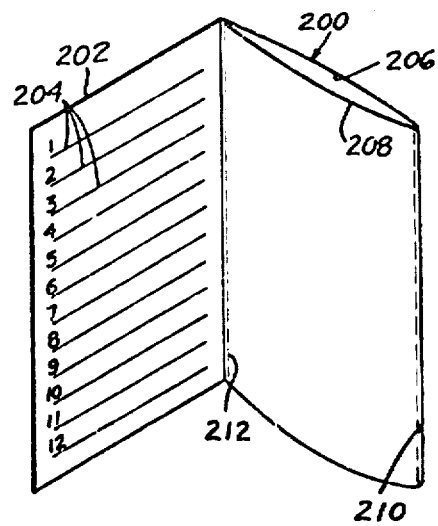
Figure 4:
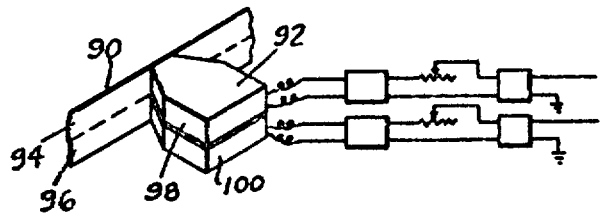
Figure 5:
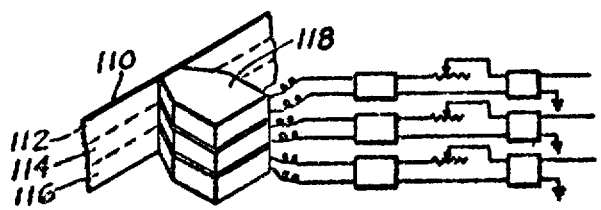
Figure 6:
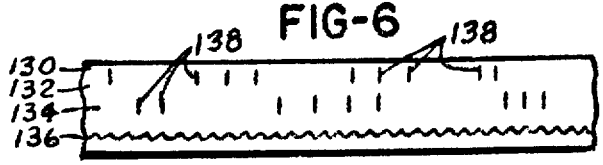
Figure 7:
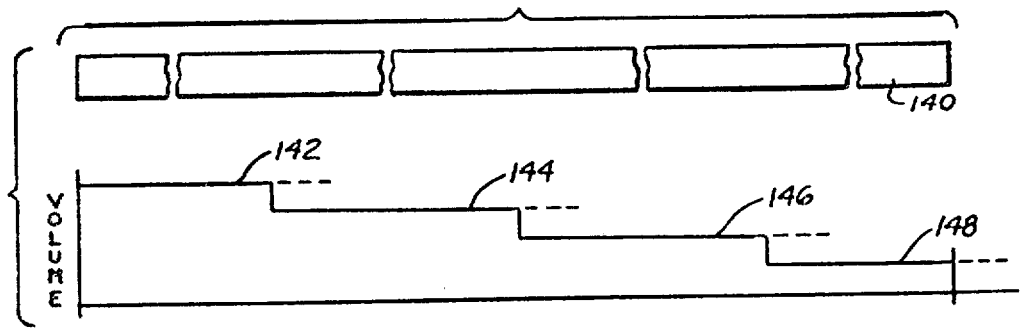
Figure 8:
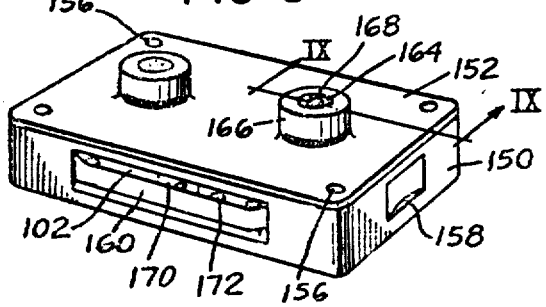
Figure 9:
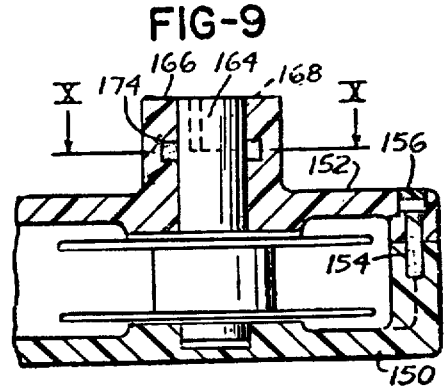
Figure 10:
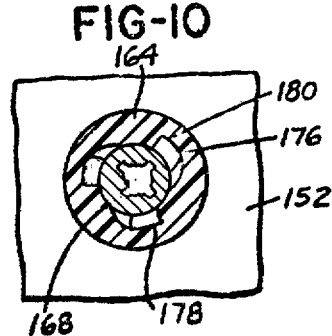

FIG. 3 schematically illustrates a test card that can be employed in connection with audiometric tests according to the present invention;

FIG. 4 is a schematic view showing a two track tape arrangement in which a single recording has one track having identifiable signals, such as words, and a second track having signals in the form of noise;

FIG. 5 schematically shows a three track tape in which two tracks of the tape have identifiable signals such as words recorded thereon for the respective ears of the subject while the third track contains background noise signals;

FIG. 6 is a schematic representation of a three track tape showing identifiable signals recorded on two of the tracks for the respective ears and a third track having noise signals recorded thereon;

FIG. 7 schematically illustrates a prerecorded tape in which the amplitude along the length of the tape adjusts in steps from a certain maximum amplitude to a certain minimum amplitude;

FIG. 8 is a perspective view of a tape cassette for use with the device of the present invention and which is arranged to permit the tape to run in one direction only;

FIG. 9 is a sectional view indicated by line IX—IX on FIG. 8 showing the location of a clutch associated with the take up spool in the cassette of FIG. 8;

FIG. 10 is a sectional view indicated by line X—X on FIG. 9 showing more in detail the one way clutch arrangement associated with the take up spool of the cassette; and FIG. 11 is a schematic representation of another type of test card that can be employed during audiometric testing according to the present invention.

BRIEF DESCRIPTION OF THE INVENTION

According to the present invention, audiometric tests are conducted by utilizing a first sound track having identifiable sounds recorded thereon, as in the form of words, and a second sound track having recorded thereon background noise simulating the environmental conditions under which the hearing acuity of the subject to be determined.

The apparatus for conducting the tests includes arrangements for supplying the signals from the respective record members selectively to one or the other or both ears of the subject and at selectable amplitudes.

DETAILED DESCRIPTION OF THE INVENTION

Figure 1:
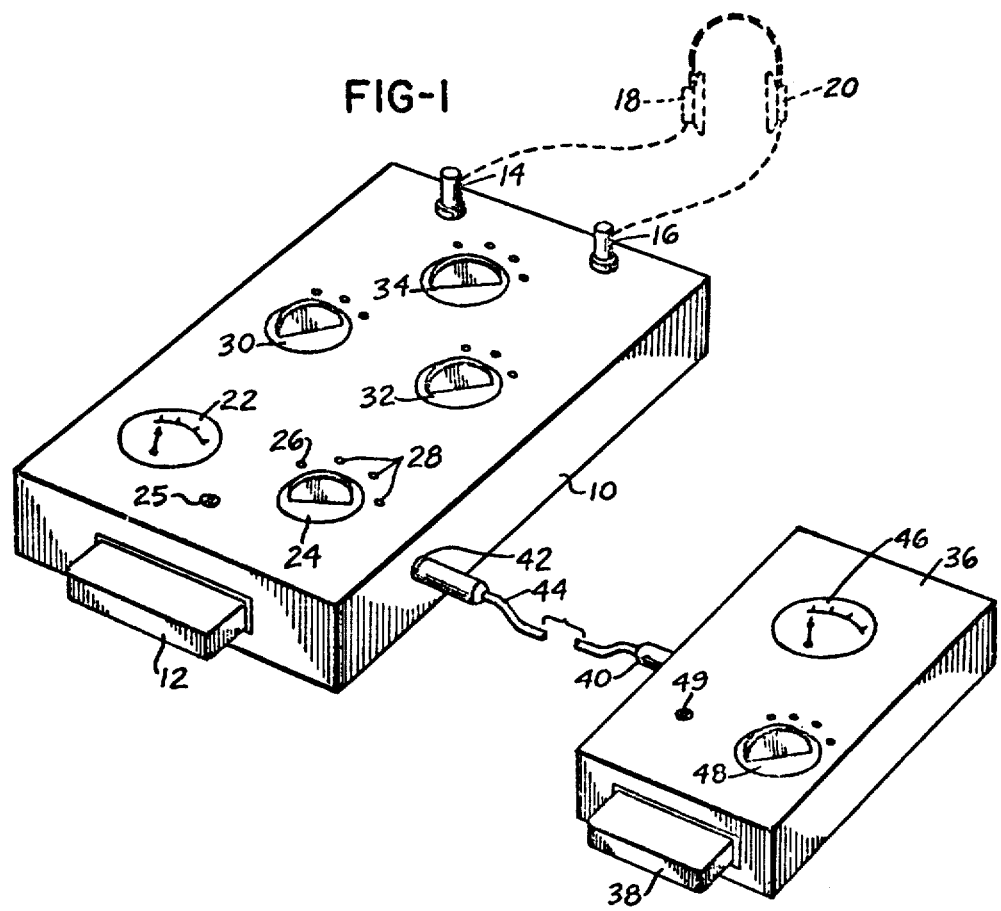
FIG. 1 is a rather schematic perspective view showing an apparatus according to the present invention.

Referring to the drawings somewhat more in detail, FIG. 1 shows a tape player 10 adapted for receiving a cassette 12. The tape player has output jacks 14 and 16 connected to the respective ear pieces, or earphones, 18 and 20 of a set of head phones.

The cassette 12 has therein a tape which is moved past a reading head in the tape player in any well known and conventional manner, such as by a constant speed capstan. The output from the reading head is conveyed through amplifying means to the jacks 14 and 16. The tape player comprises an instrument 22 operable for indicating the amplitude of the output of the tape player. Furthermore, an on-off and volume control switch knob 24 is provided having an off position indicated at 26 and a plurality of different volume settings indicated at 28.

Included in the tape player circuit ahead of the earphones are switches having knobs 30, 32 and 34 which provide for selective routing of the signals to one or the other or both of the jacks 14 and 16. The exact nature of switches under the control of knobs 30, 32 and 34 will become more apparent in connection with the description of FIG. 2.

FIG. 1 also shows a second tape player 36 adapted for receiving a cassette 38 and having an output jack 40 adapted for connection to an input jack 40 of player 10 as by the cable 44. Tape player 36 has an amplitude indicating instrument 46 and an on-off switch and volume adjusting knob at 48.

Figure 2:
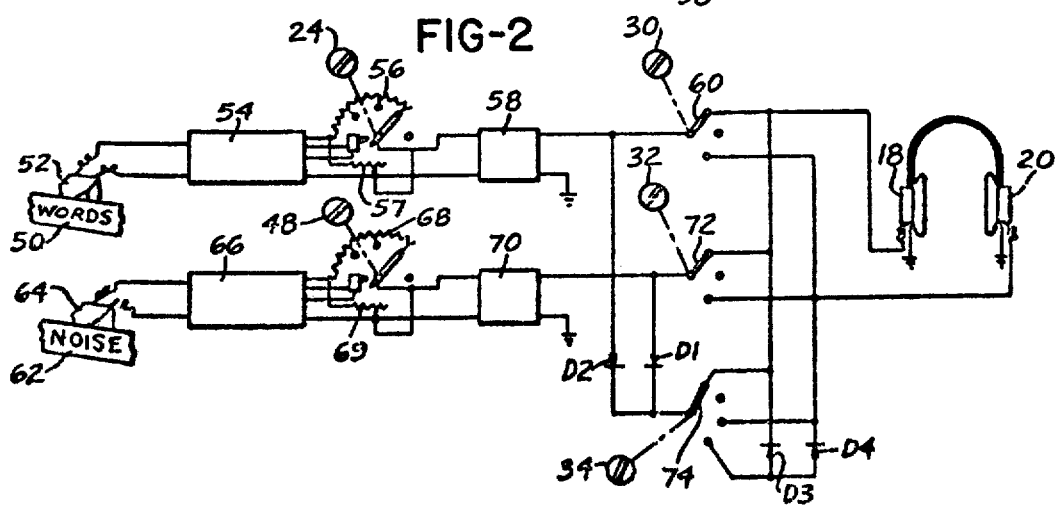
FIG. 2 is a schematic circuit diagram of the apparatus of FIG. 1 showing the control switches pertaining thereto and the volume or amplitude adjusting devices.

Turning now to FIG. 2, the cassette 12 has therein a tape 50 moveable past a reading head 52. The output from the reading head passes through amplifier means 54 and volume control 56 to a second amplifying stage 58 and from there to a switch blade 60. Amplitude adjusting means or volume control 56 is under the control of the aforementioned knob 24 and switch blade 60 is under the control of the aforementioned control knob 30.

Similarly, cassette 38 has therein a tape 62 movable past a reading head 64 with the output of the reading head passing through an amplifier 66, the amplitude controlling or adjusting means 68 and a further amplifier stage 70 to switch blade 72. Amplifier adjusting means 68 is under the control of knob 32 on tape player 10.

A further switch blade 74 is provided under the control of knob 34 of tape player 10 and this switch blade is connected via a first diode D1 with switch blade 72 and a second diode D2 with switch blade 60. Diodes D1 and D2 are isolating diodes and permits switch blade 74 to receive the outputs from both of the tapes 50 and 62 without either output interferring with the other thereof.

Switch blade 60 has a first position wherein the output thereof is directed only to earphone 18 and a second position wherein the output is directed to neither of the phones and a third position wherein the output is directed to earphone 20.

Similarly, switch blade 72 has one position wherein it is connected to earphone 18, a second position wherein it is disconnected from both of the earphones and a third position wherein it is connected to earphone 20.

Switch blade 74, which receives signals from both of the tapes 50 and 62, has a first position wherein it is connected to earphone 18, a second position wherein it is connected to neither earphone, a third position where it is connected to earphone 20 and a fourth position wherein it is connected to both of the earphones 18 and 20. This last mentioned connection includes the isolating diodes D3 and D4 which prevents signals from passing from one earphone to the other.

By the described circuit arrangement, signals from tape 50 can be supplied selectively to either one or both of the earphones or cut off from both earphones and, similarly, signals from tape 62 can be supplied to either earphone selectively or to both thereof simultaneously, or cut off from both earphones. Also, either earphone is adapted for receiving signals from one only of the tapes 50 and 62 at one time.

According the present invention, signals are recorded on tape 50 in the form of identifiable sounds, such as words, while recorded on tape 62 is noise, at least some of which is usually audible noise, and which represents the environmental conditions under which the acuity of the subject's hearing is to be determined. By recording the tapes at predetermined amplitudes, the amplitude of each output of the two tapes can be determined from the setting of the respective volume adjusting knobs 24 and 48. If desired, a trimming rheostat could be provided in association with the respective amplitude or volume adjusting devices to correct the inaccuracies in the respective tape player as indicated by the respective instruments 22 and 46. The trimming rheostat for tape player 12 has an adjusting element indicated at 25 and that for the tape player 36 has an adjusting element indicated at 49. The respective rheostats are indicated at 57 and 69 in FIG. 2.

A card to be employed for recording the results of a test may be of the type shown in FIG. 3. This card has a plurality of rows of words 80, 81, 82 and so forth down the length of the card. As will be seen, each row of words comprises, for example, three words which, when enunciated, have somewhat similar sounds. Upon conducting a test, the tape 50 would have recorded thereon a number indicated to the pertaining row and following the number a word selected from the respective row. During the test the subject checks in the boxes 83, disposed to the right of the words in the respective row, the word as the subject hears it. After the tape is completed, the examiner can indicate the respective volume settings for the first signals from tape 50 and the second signals from tape 62 on the respective lines at 84 and will identify the subject on line 85 and can record any comments in space 86 and affix his signature to line 87.

Numerous tests can be performed with the apparatus already described. For example, at a given level of background noise, each ear can be checked individually at various amplitude levels of the spoken words or at a given amplitude level of the spoken words the ears can be checked against adjusted levels of background noise. The ears can be checked individually or in unison and one ear could receive the spoken words and the other the background noise. The arrangement described permits substantially complete examination of the hearing acuity of the subject and under the exact environmental conditions to which the subject will be exposed. The test results can be duplicated and compared and records can be maintained so that a history of the changes in a subject's hearing will be readily available at all times.

While FIGS. 1 and 2 show an arrangement employing separate tapes for the words and the background noise so that the device is fully flexible and can be employed under any circumstances to establish any environmental conditions, FIGS. 4, 5 and 6 show an arrangement wherein only a single tape player is required and the noise portion of the recording is combined with the voice portion thereof.

In FIG. 4, for example, there is shown a tape 90 movable past a reading head 92. Tape 90 has a first track at 94 and a second track at 96. The reading head 92, in conformity with the nature of the tape, has a reading head portion 98 for reading track 94 and a reading head portion 100 for reading track 96. Such a tape can be employed where the nature of the environmental noise is always the same and will enable the use of a unitary tape player. The same switching arrangements could be employed as described in connection with FIG. 2 for supplying the first signals from track 94 and the second signals from track 96 to either one or the other or both of the ears as may be desired while providing for adjustment of the volume of the respective signals.

FIG. 5 shows a tape 110 having a first voice track 112, a second voice track 114 and a noise track 116. The tape is movable past a three track reading head 118 supplying respective amplifying systems and outputs 120, 122 and 124. The outputs at 120 and 122 are directed to respective ears and may, if desired, be reversed and the output at 124 is selectively supplied to either one or both of the ears. The arrangement of FIG. 5 provides for a more sophisticated test schedule than can be accomplished with the arrangement of FIG. 4.

FIG. 6 shows a tape 130 having voice tracks 132 and 134 and a noise track 136. On the voice tracks 132 and 134 are recorded word signals 138 which are arranged according to a predetermined schedule on the respective tracks. As will be seen, in some cases the signal 138 appears on both of the tracks. The tape of FIG. 6 is adapted to be played with one voice track supplying one ear and the other supplying the other ear and the noise track adapted to be supplied to either one or both of the ears.

The tape shown at 140 in FIG. 7 is recorded in a special manner so that the voice sounds recorded thereon are at predetermined amplitudes. The tape can, for example, be divided into four longitudinal sections with the amplitude or volume of the signals reproduced therefrom changing stepwise according to a predetermined schedule from the beginning of the tape to the end thereof. As shown in FIG. 7, the beginning part of the tape may have the voice signals recorded thereon at a certain higher amplitude 142, with the amplitude of the voice signals diminishing stepwise along the tape to provide for successively smaller amplitudes of the signal as shown at 144, 146 and 148. By recording the tape as illustrated in FIG. 7, absolutely standard conditions can be created for carrying out a test.

It is of advantage in certain instances, for security reasons, for example, to insure that the tests are carried out properly. For this purpose the arrangement of FIGS. 8 and 10 can be employed and which provides for the record tape to run in only one direction. The cassette containing the tape can thus be employed only for a single test and this test can be run only once. In FIGS. 8 to 10 the cassette will be seen to comprise a base portion 150 and a lid portion 152 which may be secured to the base portion as by screws 154 which are counter sunk in the lid with the upper ends of the counterbores for the screw heads sealed as by a compound indicated at 156 to prevent opening the cassette.

The cassette may comprise notches 158 for receiving detent means which will hold the cassette in the player. The tape 160 carried by the cassette is exposed through aperture 162 on one side of the cassette according to conventional practices.

The tape is entrained about a pay off spool and leads to a take up spool. At least the take up spool has a shaft 164 thereon rotatable in a boss 166 upstanding from cover 152. The shaft has a cavity 168 therein for receiving a drive member which will maintain the tape taut between the reading head 170 and the take up reel. The drive member engaging bore 168 is preferably driven through a slip drive so that the speed of movement of the tape is determined by a constant speed capstan which bears against the tape opposite the back up roller 172.

Shaft 164 for the take up reel is provided with a unidirectional clutch device 174 disposed in boss 166 and consisting of balls 176 disposed in the tapered cavities 178 surrounding shaft 164. Each ball 176 is lightly urged toward the narrow end of the respective cavity by a spring 180. This arrangement permits counterclockwise rotation of shaft 164, which is the take up direction of rotation of the take up spool, but prevents rotation of the take up spool in the opposite direction. Accordingly, the tape 160 can be moved once past the reading head but is prevented from being rewound and again run past the reading head.

Due to the arrangement of the balls in the upstanding boss 166, the clutch can be released by the application of a special tool, a magnetic tool, for example, and the tape rewound only by an authorized individual. The arrangement of FIGS. 8 to 10 can be employed where it is important to maintain strict security regulations.

Still another type of card that can be employed during a test is shown at 200 in FIG. 11. The card comprises one panel 202 having numbered lines 204 thereon on which the subject being tested writes the words pertaining to the respective numbers as he hears them. A second panel 206 of the card has the correct words listed thereon and this panel is concealed by a third panel 208 hinged to panel 206 along line 210 and detachably joined thereto along line 212. The inner side of panel 208 can be employed for the Examiner's comments regarding the test, if so desired.

The method and apparatus for conducting audiometric tests according to the present invention will be seen to establish standard conditions so that results obtained in any location and by any examiner can be reliably compared with tests taken at other locations by another Examiner. Examiner errors are substantially eliminated, thus making the tests more reliable in that respect.

True environmental conditions are simulated so that the tests are conducted under substantially the same conditions under which the subjects acuity of hearing is of the greatest importance. Still further the identifiable sounds, usually words, that are employed in the test can be selected from the glossary of terms which the subject encounters in his occupation.

Relatively simple tests can be conducted for screening individuals for simple jobs and more sophisticated tests can be conducted in relation to more complex work operations.

Various modifications can be made in the described method and apparatus within the purview of the appended claims.

What is claimed is:

1. In a device for use in conducting audiometric tests on a subject: record means bearing recorded signals, transcriber means including a frame adapted to receive said record means and including reading means operable to read the signals carried by a record means in said frame upon movement of the record means relative to the said reading means, said transcriber means including drive means for driving a said record means in said frame relative to said reading means, said transcriber means also including transducer means comprising an earphone for each ear of a subject under test and operable to convert the signals read from said record means by said reading means to acoustic air borne signals including a first set of acoustic signals in the form of spoken sounds and a second set of acoustic signals in the form of noise of a selected environmental type, at least some of said noise falling within the audible range, and selector means operatively connected to said earphones and selectively operable for causing the supplying of each of said first and second sets of acoustic signals to either one or both of the said earphones, adjustable means for selectively adjusting the amplitude level of said first and second sets of acoustic signals independently, said record means comprising support means receivable by said frame and record element means contained within said support means, said drive means being adapted for operatively engaging and driving said record element means in a single predetermined direction only relative to said support means, and continuously effective control means operatively disposed between said record element means and the said support means and preventing movement of said record element means relative to said support means in a direction other than said single predetermined direction when said drive means is operatively engaged with said record means, said control means adapted to be made ineffective only by means of a special tool thereby to prevent resetting of said record element means by other than an authorized person.

2. A device according to claim 1 in which said adjustable means comprises means for adjusting the amplitude level of at least said first acoustic signals in steps.

3. A device according to claim 1 in which said record element means is a magnetic tape, said support means including housing means, pay-out and take-up spools in said housing means and to which the ends of the tape are connected for transfer of the tape between the spools, each said spool having a cylindrical hub, a bearing in the housing means receiving each said hub, said control means comprising a unidirectional clutch between the said hub of the take-up spool and the said bearings therefor, said drive means being drivingly engaged with the said hub of said take-up spool when said housing means is in operative position relative to said frame.

4. The method of performing audiometric tests on a subject which comprises: developing a first set of signals in the form of identifiable chronologically spaced phonic sounds and a second set of signals in the form of environmental noise which is normal in a predetermined situation, at least a part of said noise falling within the audible range, said noise being that noise in the presence of which it is desired to determine the hearing acuity of the subject, supplying said first set of signals via earphone means to at least one ear of the subject under test while simultaneously supplying said second set of signals via earphone means to at least one ear of the subject under test, varying the relative amplitudes of the respective said first and second sets of signals, and determining the hearing acuity of the subject by the number of individual signals of said first set of signals which are correctly identified by the subject during a single test cycle in which said second set of signals are supplied continuously and said first set of signals are supplied in succession and one time only.

5. A method according to claim 4 in which the variation in the relative amplitudes of said first and second signals is accomplished by supplying said first set of signals at an amplitude which changes automatically and unidirectionally at predetermined intervals in steps from a predetermined initial amplitude to a predetermined final amplitude, and maintaining the amplitude of said second set of signals constant.

6. A method according to claim 4 in which said first set of signals is in the form of spoken words, and the subject identifies each word as heard by the subject from a group which includes the correct word and at least one other similar sounding word.

7. A method according to claim 4 which includes supplying said first and second sets of signals selectively via earphone means to the subjects ears singly and in unison.

8. A method according to claim 4 which includes supplying said first set of signals via the earphone means singly to the respective ears of the subject during respective intervals and to both ears of the subject simultaneously during another interval while continuously supplying said second set of signals via the earphone means to at least one ear of the subject.

* * * * *